US007674034B2

(12) United States Patent
Kozlowski et al.

(10) Patent No.: US 7,674,034 B2
(45) **Date of Patent: *Mar. 9, 2010**

(54) FOOD MIXING MACHINE AND AGITATOR THEREFOR

(75) Inventors: Eugene J. Kozlowski, Medina, OH (US); Fred H. Mehlman, Brunswick, OH (US); Laura L. Manson, Medina, OH (US)

(73) Assignee: Vita-Mix Corporation, Cleveland, OH (US)

( * ) Notice: Subject to any disclaimer, the term of this patent is extended or adjusted under 35 U.S.C. 154(b) by 655 days.

This patent is subject to a terminal disclaimer.

(21) Appl. No.: 11/593,199

(22) Filed: Nov. 3, 2006

(65) Prior Publication Data

US 2008/0106970 A1 May 8, 2008

(51) Int. Cl.
*A47J 43/07* (2006.01)
*B01F 7/32* (2006.01)

(52) U.S. Cl. ................. 366/317; 366/325.7; 366/328.1; 366/343

(58) Field of Classification Search .............. 366/325.7, 366/325.94, 325.91, 197, 198, 328.1, 329.1–329.2, 366/315–317, 279, 331, 342–343, 325.1, 366/64–66, 96–98, 129; 416/227 R, 227 A
See application file for complete search history.

(56) References Cited

U.S. PATENT DOCUMENTS 270,015 A * 1/1883 Carter ........................ 366/243
684,966 A * 10/1901 Weisenback ............. 366/325.7
846,661 A * 3/1907 Godward ..................... 416/76
1,055,484 A * 3/1913 Mohr ..................... 416/214 R
1,217,832 A * 2/1917 Saito ........................... 416/77
1,460,493 A * 7/1923 Leinan ........................ 416/76
1,492,448 A * 4/1924 Gotis ...................... 366/325.7
1,738,112 A * 12/1929 Myers ........................ 416/122
1,966,352 A * 7/1934 Mahony ...................... 416/75
2,093,586 A * 9/1937 Day ........................... 425/456
2,254,236 A * 9/1941 Myers ........................ 416/131

(Continued)

FOREIGN PATENT DOCUMENTS

FR 2670376 A1 * 6/1992

OTHER PUBLICATIONS

Prior Art Device From Duke Machine Made for Dairy Queen.

(Continued)

*Primary Examiner*—Charles E Cooley
(74) *Attorney, Agent, or Firm*—Renner, Kenner, Greive, Bobak, Taylor & Weber

(57) ABSTRACT

A food mixing machine (10) has a rotatable shaft (18) which is attached to the shaft (21) of an agitator (20). The shaft (21) carries a ring (24) and a disk (23), and the ring (24) carries a cloverleaf-shaped chip (25). The chip (25) has opposed, generally flat lobes (27) with the opposed lobes (29) positioned between the lobes (27). The lobes (29) are inclined relative to the lobes (27). Cutout areas (31) are formed between the lobes (27, 29), and as the agitator (20) is being rotated by the shaft (18), a leading edge (32) on the lobes (27, 29) at the cutout areas (31) contacts the food being mixed. The leading edges (32) have a larger radius of curvature than the trailing edges (33) on each lobe (27, 29).

10 Claims, 4 Drawing Sheets

U.S. PATENT DOCUMENTS

| | | | | | |
|---|---|---|---|---|---|
| 2,452,923 | A | * | 11/1948 | Graff | 416/142 |
| 2,630,303 | A | * | 3/1953 | Krucker | 366/331 |
| 4,112,311 | A | * | 9/1978 | Theyse | 290/44 |
| 4,311,158 | A | * | 1/1982 | Harvey | 134/138 |
| D305,973 | S | | 2/1990 | Barnard et al. | |
| 6,012,473 | A | * | 1/2000 | Koyama | 134/149 |
| 6,736,538 | B2 | * | 5/2004 | Bittner | 366/199 |
| D551,020 | S | * | 9/2007 | Kozlowski et al. | |
| D557,984 | S | * | 12/2007 | Kozlowski et al. | |
| 2008/0106970 | A1 | * | 5/2008 | Kozlowski et al. | 366/331 |
| 2008/0253224 | A1 | * | 10/2008 | Kozlowski et al. | 366/342 |

OTHER PUBLICATIONS

Prior Art Device From Big Chill Machine of Hampton Beach.

* cited by examiner

FOOD MIXING MACHINE AND AGITATOR THEREFOR

TECHNICAL FIELD

This invention relates to a food mixing machine which has an agitator which may be carried by the rotatable shaft of the food mixing machine. More particularly, this invention relates to an agitator which efficiently mixes foods, such as ice cream and condiments or the like, in a cup without damaging the cup.

BACKGROUND ART

Machines which are adapted to mix foods in a cup are well known in the art. Typically, these machines are utilized in fast food establishments, ice cream parlors, or the like, and utilize some type of agitating device carried at the end of a rotatable shaft. A typical agitator includes a ring having a central disk extending from one side of the ring to the other side of the ring. The user fills his/her cup with the food, such as ice cream, and condiments such as candies or the like, and then positions the cup so that the agitator is in the food. When the machine is turned on, the agitator is rotated with the intention of mixing the candies into the ice cream. The user can often assist this process by moving the cup circumferentially or vertically.

However, the prior art mixing machine and agitator operated as described above are not without their problems. First, no known agitator is capable of thoroughly and efficiently mixing the majority of the volume of the cup, including the breaking up of large candy or other condiment particles. In addition, known agitators do not mix the materials well at the sides or bottom of the cup, and if the user attempts to manipulate the cup to do so, the configuration of the prior art agitators can potentially cause damage to the sides or bottom of the cup.

Thus, the need exists for a mixing machine with an improved agitator which is free of the problems plaguing the prior art.

DISCLOSURE OF THE INVENTION

It is thus an object of one aspect of the present invention to provide food mixing machine with an agitator that efficiently and thoroughly mixes food in a cup.

It is another object of an aspect of the present invention to provide an agitator, as above, which mixes the food all the way to the bottom of the cup.

It is a further object of an aspect of the present invention to provide an agitator, as above, which creates axial flow of the food to provide increased mixing.

It is an additional object of an aspect of the present invention to provide an agitator, as above, which will break up large particles in the food being mixed.

It is yet another object of an aspect of the present invention to provide an agitator, as above, which will not damage the cup.

These and other objects of the present invention, as well as the advantages thereof over existing prior art forms, which will become apparent from the description to follow, are accomplished by the improvements hereinafter described and claimed.

In general, an agitator made in accordance with one aspect of the present invention has a shaft which is adapted to be attached to the rotatable shaft of a food mixing machine. A ring is attached to the shaft at a first point near the rotatable shaft and at a second point spaced along the shaft from the first point. A chip is carried by the ring generally at the second point.

In accordance with another aspect of the invention, an agitator includes a generally circular ring and a shaft adapted to be carried by the rotatable shaft of a food mixer and attached to the ring at least a first point. A chip is attached to the ring at a second point generally diametrically opposed to the first point.

A food mixing machine made in accordance with the present invention includes a rotatable shaft and an agitator. The agitator has a shaft carried by the rotatable shaft. A ring is attached to the agitator shaft at a first point near the rotatable shaft and at a second point spaced along the agitator shaft from the first point. A chip is carried by the ring generally at the second point.

A preferred exemplary agitator for a food mixer according to the concepts of the present invention is shown by way of example in the accompanying drawings without attempting to show all the various forms and modifications in which the invention might be embodied, the invention being measured by the appended claims and not by the details of the specification.

PREFERRED EMBODIMENT FOR CARRYING OUT THE INVENTION

Figure 1:
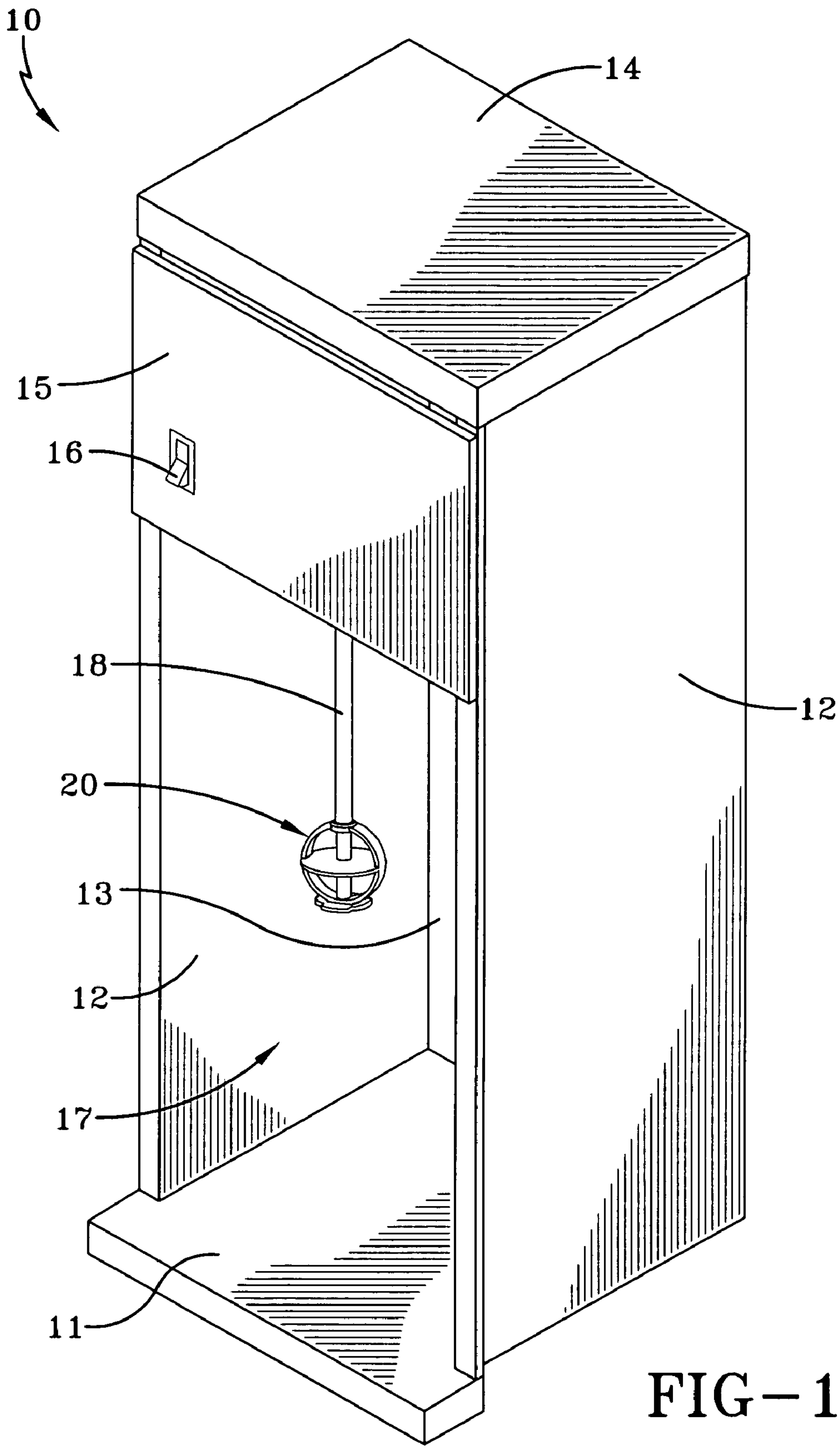
FIG. 1 is a somewhat schematic perspective view of a food mixing machine and agitator made in accordance with the present invention.

A food mixing machine is generally indicated by the numeral 10 and is shown in FIG. 1 as including a base 11, opposed side walls 12 extending upwardly from base 11, and a rear wall 13 extending upwardly from base 11 between the side walls 12. A cover plate 14 is positioned on top of walls 12 and 13 and a face plate 15 extends between side walls 12 near the top thereof. Face plate 15 carries a power switch 16 which is utilized to selectively activate or deactivate a motor (not shown) which is housed between cover plate 14, side walls 12, face plate 15, and rear wall 13. It should be appreciated that means other than switch 16 may be utilized to activate the motor. The front of machine 10, below face plate 15, is open to form an open compartment 17. A motor shaft 18 extends downwardly from the motor and into the compartment 17. Shaft 18 carries an agitator made in accordance with the present invention and generally indicated by the numeral 20. Upon activation of the motor, shaft 18 and agitator 20 will rotate to mix food, such as ice cream with candy condiments or the like, in a cup which is positioned around shaft 18 so that the agitator 20 is within the food. While agitator 20, now to be described, has been shown in the environment of machine 10, it will be appreciated that agitator 20 could well be utilized in machines of a wide variety of configurations, even hand-held mixers.

Agitator 20 includes a shaft 21 having a threaded end 22 which is adapted to be connected to the bottom of motor shaft 18 to thereby render agitator 20 rotatable with shaft 18. Shaft 21 thus defines the axis of rotation of agitator 20. Shaft 21 carries a generally circular disk 23 and is also attached, at two locations, to a ring 24 which is in the form of a circumferential segment of a sphere. Ring 24 is thus attached to shaft 21 at a first point adjacent to shaft 21 and at a second point spaced from the first point along shaft 21 and diametrically opposed to the first point. Disk 23 is positioned generally centrally of ring 24 and thus represents the equator of the sphere of which ring 24 is a segment. When rotating to mix foods, ring 24 provides efficient mixing of the majority of the food in the cup, and in particular, ring 24 is very useful in breaking up large particles in the food. Disk 23 is quite useful to protect the cup from being damaged by ring 24. That is, if the agitator 20 is brought into contact, or near contact, with the cup, the cup will ride on the disk 23 and not be engaged by the edge of the ring 24 which might puncture the cup.

Figure 5:
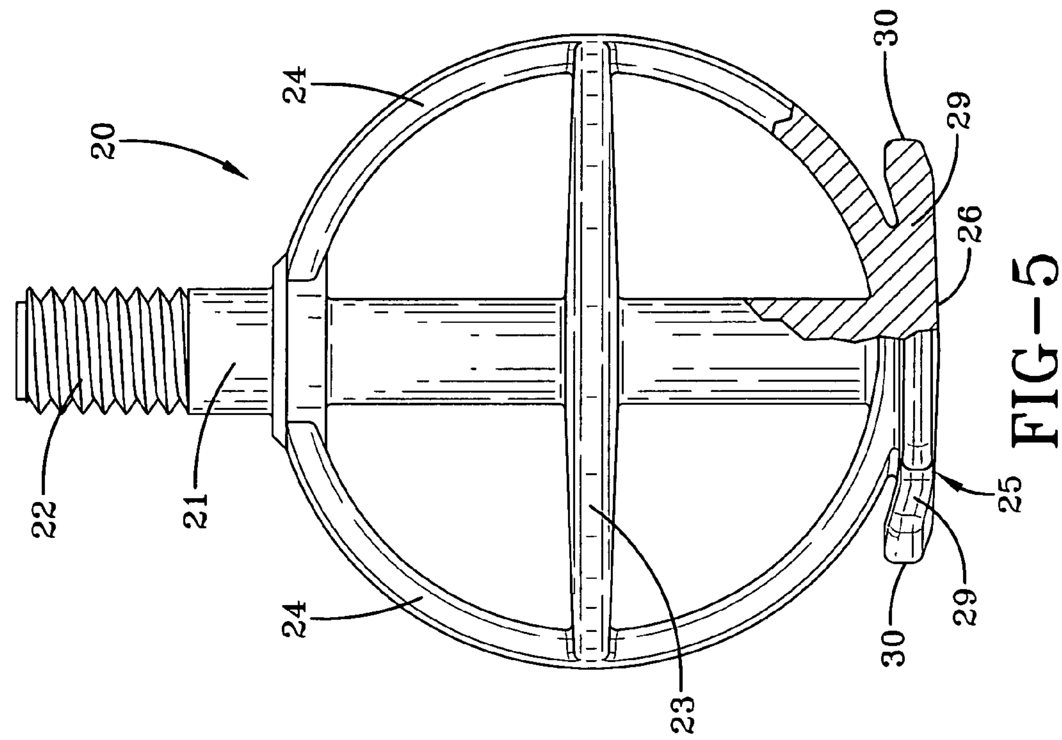
FIG. 5 is a front elevational view of the agitator of FIG. 2.
Figure 4:
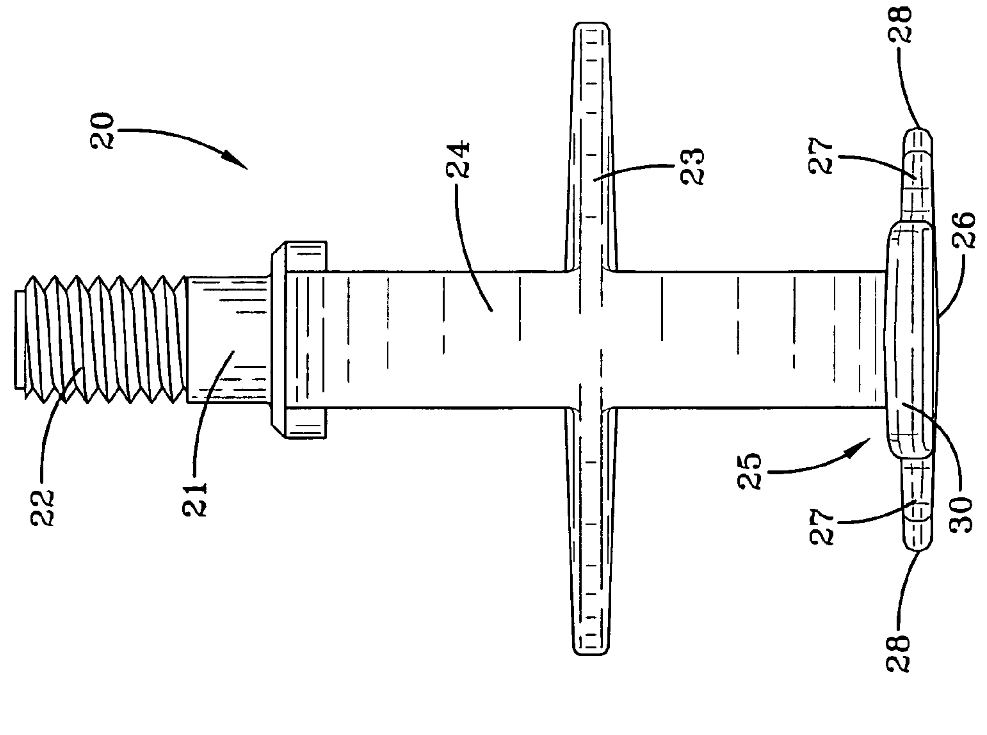
FIG. 4 is a side elevational view of the agitator of FIG. 2.

A somewhat cloverleaf-shaped chip, generally indicated by the numeral 25, is attached to a radially outer surface of ring 24 at a location diametrically opposite to the point where ring 24 is attached to shaft 21 near the threaded portion 22 thereof. As such, when agitator 20 is attached to mixing motor shaft 18, chip 25 is located at the bottom of agitator 20. Chip 25 includes a generally flat, bottom, central surface 26. Lobes 27 are positioned at opposed ends of surface 26 and are likewise generally flat. Lobes 27 each have a curved lateral edge 28. Chip 25 also includes opposed lobes 29 which are positioned between lobes 27. As best shown in FIG. 5, lobes 29 are generally upwardly inclined, preferably at an angle of about ten degrees, with respect to surface 26 and lobes 27. Like lobes 27, lobes 29 each have a 18 and agitator 20 will rotate to mix food, such as ice cream with candy condiments or the like, in a cup which is positioned around shaft 18 so that the agitator 20 is within the food. While agitator 20, now to be described, has been shown in the environment of machine 10, it will be appreciated that agitator 20 could well be utilized in machines of a wide variety of configurations, even hand-held mixers.

Agitator 20 includes a shaft 21 having a threaded end 22 which is adapted to be connected to the bottom of motor shaft 18 to thereby render agitator 20 rotatable with shaft 18. Shaft 21 thus defines the axis of rotation of agitator 20. Shaft 21 carries a generally circular disk 23 and is also attached, at two locations, to a ring 24 which is in the form of a circumferential segment of a sphere. Ring 24 is thus attached to shaft 21 at a first point adjacent to shaft 21 and at a second point spaced from the first point along shaft 21 and diametrically opposed to the first point. Disk 23 is positioned generally centrally of ring 24 and thus represents the equator of the sphere of which ring 24 is a segment. When rotating to mix foods, ring 24 provides efficient mixing of the majority of the food in the cup, and in particular, ring 24 is very useful in breaking up large particles in the food. Disk 23 is quite useful to protect the cup from being damaged by ring 24. That is, if the agitator 20 is brought into contact, or near contact, with the cup, the cup will ride on the disk 23 and not be engaged by the edge of the ring 24 which might puncture the cup.

A somewhat cloverleaf-shaped chip, generally indicated by the numeral 25, is attached to a radially outer surface of ring 24 at a location diametrically opposite to the point where ring 24 is attached to shaft 21 near the threaded portion 22 thereof. As such, when agitator 20 is attached to mixing motor shaft 18, chip 25 is located at the bottom of agitator 20. Chip 25 includes a generally flat, bottom, central surface 26. Lobes 27 are positioned at opposed ends of surface 26 and are likewise generally flat. Lobes 27 each have a curved lateral edge 28. Chip 25 also includes opposed lobes 29 which are positioned between lobes 27. As best shown in FIG. 5, lobes 29 are generally upwardly inclined, preferably at an angle of about ten degrees, with respect to surface 26 and lobes 27. Like lobes 27, lobes 29 each have a curved lateral edge 30. As a result of this configuration, a cutout 31 is formed between each lobe 27 and each lobe 29. Chip 25 could include additional lobes or pairs of lobes with cutouts 31 formed therebetween without departing from the concepts of the present invention.

Figure 3:
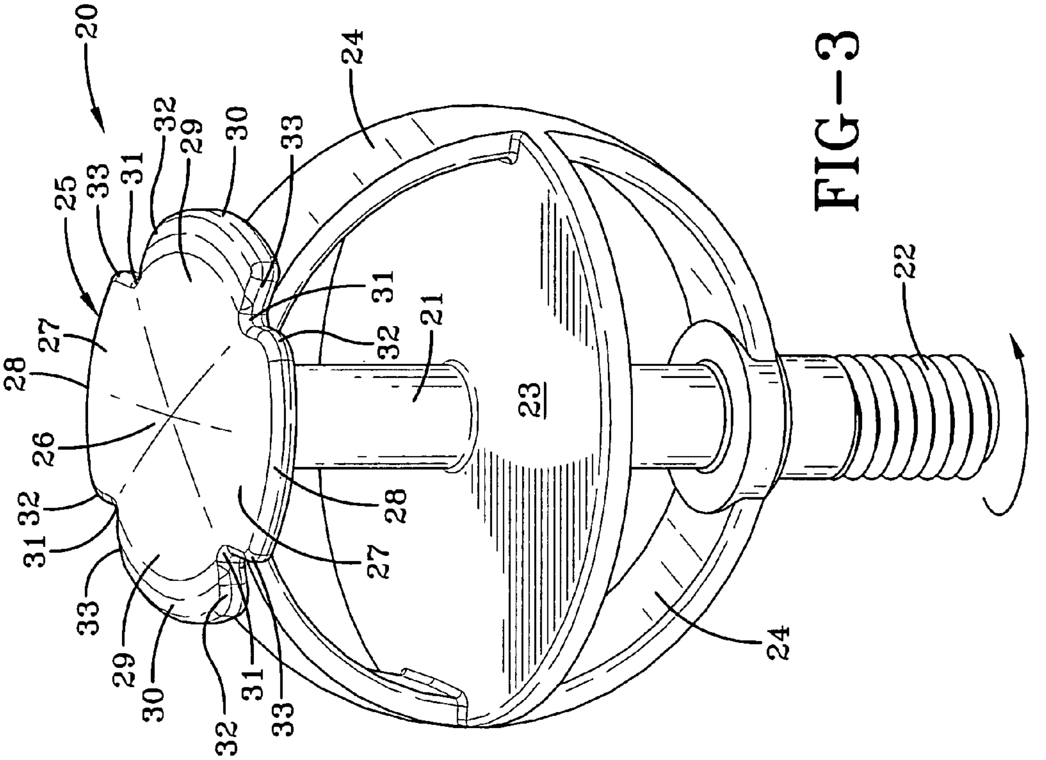
FIG. 3 is a bottom, left side, rear perspective view of the agitator of FIG. 2.
Figure 2:
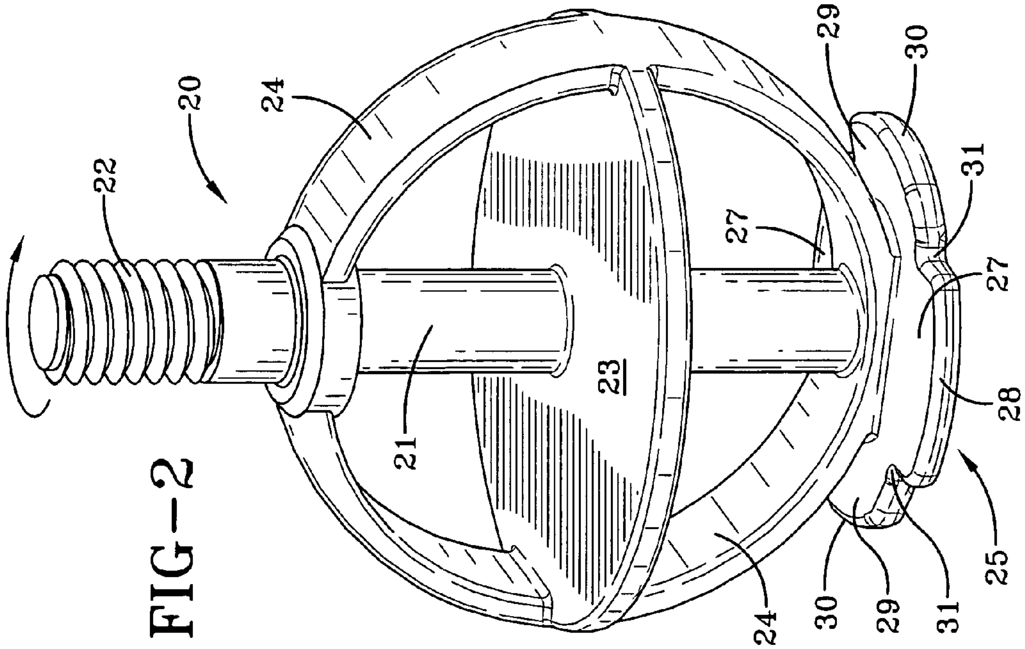
FIG. 2 is a top, right side, front perspective view of the agitator of the present invention.
Figure 6:
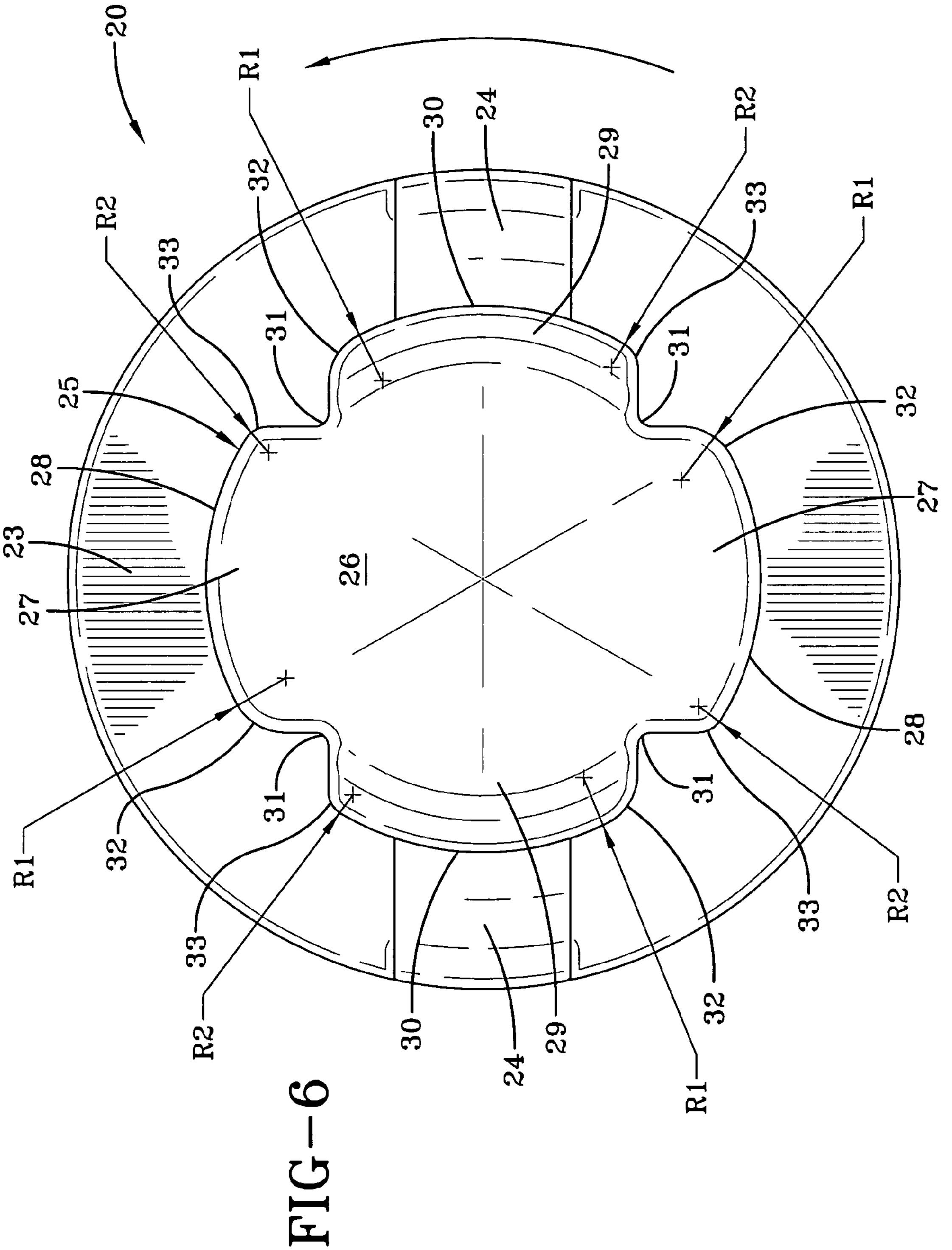
FIG. 6 is a bottom plan view of the agitator of FIG. 2.

When the agitator 20 is rotating with motor shaft 18, it rotates in the direction of the arrows in FIGS. 2, 3 and 6. As such, each lobe 27 and 29 has a leading edge 32 and a trailing edge 33 at the ends of surfaces 28 and 30 at the area of cutouts 31. As shown, the radius of curvature R1 at each leading edge 32 is larger than the radius of curvature R2 at each trailing edge 33 as each edge surface 28 and 30 merges into the cutout areas 31.

In operation, when the agitator 20 is rotating as described, the flat surface 26 of chip 25 protects the bottom of the cup carrying the food from damage by spreading the thrust forces over a larger area than that which would otherwise have been created by a point on the tangent to the bottom of ring 24 if chip 25 were not present.

The configuration of chip 25, when revolving, also significantly contributes to the complete mixing of the food product in the cup in the following manner. In an overall sense, chip 25 greatly assists in mixing ingredients at the bottom of the cup which would not otherwise be mixed by the ring 24 alone. Moreover, this mixing is enhanced by the fact that lobes 29 are inclined at an angle relative to lobes 27. As such, mixing is taking place in two planes resulting in more thorough mixing. The presence of the cutouts 31 also enhances mixing in that additional surfaces are created which assist the mixing process. Moreover, it has been found that by providing a leading edge 32 with a larger radius of curvature than the trailing edge 33 at these cutout areas 31, as previously described, the efficiency of the mixing is further increased.

In view of the foregoing, it should be evident that an agitator for a food mixing machine as described herein substantially improves the art and otherwise accomplishes the objects of the invention.

What is claimed is:

1. An agitator adapted to be attached to a rotatable shaft of a food mixing machine comprising a shaft adapted to be attached to the rotatable shaft, a ring attached to said shaft at a first point near the rotatable shaft and at a second point spaced along said shaft from said first point, and a chip carried by said ring generally at said second point, said chip including a generally flat central surface, a pair of lobes extending from opposed sides of said central surface, and a second pair of lobes extending from opposed sides of said central surface and positioned between said pair of lobes, wherein a cutout area is formed between each said lobe, each said lobe having a leading edge and a trailing edge at said cutout areas, said leading edges having a larger radius of curvature than said trailing edges.

2. The agitator of claim 1 wherein said chip is generally cloverleaf-shaped.

3. The agitator of claim 1 wherein said pair of lobes are generally flat and said second pair of lobes are angled relative to said pair of lobes.

4. The agitator of claim 1 further comprising a disk carried by said ring.

5. The agitator of claim 4 wherein said disk is within said ring and spaced from said chip.

6. The agitator of claim 1 wherein said shaft has a threaded portion adapted to be attached to the rotatable shaft.

7. An agitator adapted to be attached to a rotatable shaft of a food mixer comprising a generally circular ring, a shaft adapted to be attached to the rotatable shaft, said shaft being attached to said ring at at least a first point, and a chip attached to said ring at a second point generally diametrically opposed to said first point, said chip including a generally flat central surface, a pair of lobes extending from opposed sides of said central surface, and a second pair of lobes extending from opposed sides of said central surface and positioned between said pair of lobes, wherein a cutout area is formed between each said lobe, each said lobe having a leading edge and a trailing edge at said cutout areas, said leading edges having a larger radius of curvature than said trailing edges.

8. The agitator of claim 7 wherein said pair of lobes are generally flat and said second pair of lobes are angled relative to said pair of lobes.

9. A food mixing machine comprising a rotatable shaft; and an agitator; said agitator having a shaft carried by said rotatable shaft, a ring attached to said agitator shaft at a first point near said rotatable shaft and at a second point spaced along said agitator shaft from said first point, and a chip carried by said ring generally at said second point, said chip including a generally flat central surface and a pair of lobes extending from opposed sides of said central surface, and a second pair of lobes extending from opposed sides of said central surface and positioned between said pair of lobes, wherein a cutout area is formed between each said lobe, each said lobe having a leading edge and a trailing edge at said cutout areas, said leading edges having a larger radius of curvature than said trailing edges.

10. The food mixing machine of claim 9 wherein said pair of lobes are generally flat and said second pair of lobes are angled relative to said pair of lobes.

* * * * *